United States Patent
Lawrence et al.

(10) Patent No.: US 12,418,724 B2
(45) Date of Patent: Sep. 16, 2025

(54) DARK FLASH NORMAL CAMERA

(71) Applicant: Google LLC, Mountain View, CA (US)

(72) Inventors: Jason Lawrence, Seattle, WA (US); Supreeth Achar, Seattle, WA (US); Zhihao Xia, St. Louis, MO (US)

(73) Assignee: GOOGLE LLC, Mountain View, CA (US)

( * ) Notice: Subject to any disclaimer, the term of this patent is extended or adjusted under 35 U.S.C. 154(b) by 390 days.

(21) Appl. No.: 18/246,609

(22) PCT Filed: Nov. 9, 2021

(86) PCT No.: PCT/US2021/072300
§ 371 (c)(1),
(2) Date: Mar. 24, 2023

(87) PCT Pub. No.: WO2022/099322
PCT Pub. Date: May 12, 2022

(65) Prior Publication Data
US 2023/0319424 A1  Oct. 5, 2023

Related U.S. Application Data

(60) Provisional application No. 63/198,836, filed on Nov. 16, 2020, provisional application No. 63/198,736, filed on Nov. 9, 2020.

(51) Int. Cl.
*H04N 23/72* (2023.01)
*G06T 5/50* (2006.01)
(Continued)

(52) U.S. Cl.
CPC .............. *H04N 23/72* (2023.01); *G06T 5/50* (2013.01); *G06T 5/70* (2024.01); *H04N 9/646* (2013.01);
(Continued)

(58) Field of Classification Search
CPC ........ H04N 23/72; H04N 9/646; H04N 23/11; H04N 23/20; H04N 23/56; H04N 23/74;
(Continued)

(56) References Cited

U.S. PATENT DOCUMENTS 9,692,991 B2 * 6/2017 Zhang .................... H04N 23/11
11,568,595 B2 * 1/2023 Logothetis ............ G06N 3/045
(Continued)

FOREIGN PATENT DOCUMENTS

JP    2002133446 A    5/2002
JP    2002171519 A    6/2002
(Continued)

OTHER PUBLICATIONS

Office Action for Japanese Application No. 2023-527409 (with English translation), mailed Sep. 3, 2024, 14 pages.
(Continued)

*Primary Examiner* — Michael S Osinski
(74) *Attorney, Agent, or Firm* — Brake Hughes Bellermann LLP

(57) ABSTRACT

Techniques of estimating surface normals and reflectance from poorly-lit images includes using, in addition to an RGB image of a subject of a set of subjects, an image illuminated with near-infrared (NIR) radiation to determine albedo and surface normal maps for performing an image relighting, the image being captured with the NIR radiation from essentially the same perspective from which the RGB image was captured. In some implementations, a prediction engine takes as input a single RGB image and a single NIR image and estimates surface normals and reflectance from the subject.

20 Claims, 7 Drawing Sheets

(51) Int. Cl.

| | |
|---|---|
| *G06T 5/70* | (2024.01) |
| *H04N 9/64* | (2023.01) |
| *H04N 23/11* | (2023.01) |
| *H04N 23/20* | (2023.01) |
| *H04N 23/56* | (2023.01) |
| *H04N 23/74* | (2023.01) |
| *H04N 23/76* | (2023.01) |
| *H04N 23/84* | (2023.01) |

(52) U.S. Cl.
CPC ............ *H04N 23/11* (2023.01); *H04N 23/20* (2023.01); *H04N 23/56* (2023.01); *H04N 23/74* (2023.01); *H04N 23/76* (2023.01); *H04N 23/84* (2023.01); *G06T 2207/10012* (2013.01); *G06T 2207/10024* (2013.01); *G06T 2207/10048* (2013.01); *G06T 2207/10152* (2013.01); *G06T 2207/20081* (2013.01); *G06T 2207/20084* (2013.01); *G06T 2207/20212* (2013.01)

(58) Field of Classification Search
CPC ...... H04N 23/76; H04N 23/84; H04N 13/239; H04N 23/64; H04N 23/71; H04N 13/25; H04N 2013/0081; H04N 23/13; H04N 23/45; H04N 23/73; H04N 5/33; G06T 5/50; G06T 5/70; G06T 2207/10012; G06T 2207/10024; G06T 2207/10048; G06T 2207/10152; G06T 2207/20081; G06T 2207/20084; G06T 2207/20212; G06T 5/94; G06T 11/60; G06T 2207/10028; G06T 2207/30196; G06T 7/55; G06N 3/045; G06N 3/08; G06N 3/0464; G06V 10/143; G06V 10/26; G06V 10/774; G06V 10/82

See application file for complete search history.

(56) References Cited

U.S. PATENT DOCUMENTS

| | | | | |
|---|---|---|---|---|
| 11,689,822 | B2* | 6/2023 | Peng | G06V 40/16 348/164 |
| 11,748,991 | B1* | 9/2023 | Day | B60Q 3/85 348/143 |
| 11,776,095 | B2* | 10/2023 | Sun | G06T 5/60 382/274 |
| 11,825,182 | B2* | 11/2023 | Chng | G01S 17/58 |
| 11,917,272 | B2* | 2/2024 | Skorka | H04N 25/131 |
| 11,989,971 | B2* | 5/2024 | Riviere | H04N 23/90 |
| 12,198,301 | B2* | 1/2025 | Zhang | H04N 9/78 |
| 2004/0204927 | A1* | 10/2004 | Marschner | G06T 15/506 703/2 |
| 2015/0381965 | A1* | 12/2015 | Atanassov | G06T 3/4061 348/47 |
| 2020/0077076 | A1 | 3/2020 | Xue et al. | |
| 2020/0334450 | A1* | 10/2020 | Shen | G06F 18/251 |
| 2020/0357104 | A1* | 11/2020 | Luo | G06T 7/40 |
| 2021/0397817 | A1* | 12/2021 | Su | G06V 40/166 |
| 2022/0092293 | A1* | 3/2022 | Riviere | G06V 40/169 |
| 2022/0215266 | A1* | 7/2022 | Venkataraman | G06T 19/20 |
| 2023/0041560 | A1* | 2/2023 | Kalra | G01B 11/245 |
| 2023/0088801 | A1* | 3/2023 | Lawrence | H04N 23/71 348/164 |
| 2023/0196739 | A1* | 6/2023 | Kida | G06V 10/803 382/159 |
| 2024/0212106 | A1* | 6/2024 | LeGendre | G06T 5/94 |

FOREIGN PATENT DOCUMENTS

| | | |
|---|---|---|
| JP | 2015019346 A | 1/2015 |
| JP | 2019139694 A | 8/2019 |
| WO | 2019181125 A1 | 9/2019 |

OTHER PUBLICATIONS

Barron, et al., "Shape, Illumination, and Reflectance from Shading", IEEE Transactions on Pattern Analysis and Machine Intelligence, Oct. 7, 2020, 26 pages.

Barron, "Shapes, Paint, and Light", Electrical Engineering and Computer Sciences University of California at Berkeley, Technical Report No. UCB/EECS-2013-142, Http://www.eecs.berkeley.edu/Pubs/TechRpts/2013/EECS-2013-142.html, Aug. 12, 2013, 100 pages.

Bennett, et al., "Multispectral Bilateral Video Fusion", IEEE Transactions on Image Processing, vol. 16, No. 5, May 2007, pp. 1185-1194.

Cao, "Stereoscopic Flash and No. Flash Photography for Shape and Albedo Recovery", CVPR 2020, pp. 3430-3439.

Cheng, "Non-local Intrinsic Decomposition with Near-infrared Priors", ICCV 2019, Oct. 2019, pp. 2521-2530.

Choe, et al., "Exploiting Shading Cues in Kinect IR Images for Geometry Refinement", CVPR 2014, Jun. 2014, 8 pages.

Choe, "Ranus: RGB and NIR Urban Scene Dataset for Deep Scene Parsing", IEEE Robotics and Automation Letters, vol. 3, No. 3, Feb. 2018, pp. 1808-1815.

Choe, et al., "Simultaneous Estimation of Near IR BRDF and Fine-Scale Surface Geometry", CVPR 2016, Jun. 2016, 9 pages.

Deng, et al., "Accurate 3D Face Reconstruction with Weakly-Supervised Learning: From Single Image to Image Set", CVPR 2019, 11 pages.

Fattal, et al., "Multiscale Shape and Detail Enhancement from Multi-light Image Collections", ACM Transactions on Graphics, vol. 26, No. 3, 2007, 9 pages.

Gunawardane, et al., "Invisible Light: Using Infrared for Video Conference Relighting", 2010 IEEE International Conference on Image Processing, Sep. 2010, 4 pages.

Hague, et al., "High Quality Photometric Reconstruction using a Depth Camera", CVPR 2014, Jun. 2014, 8 pages.

Hansen, et al., "3D face reconstructions from photometric stereo using near infrared and visible light", Computer Vision and Image Understanding 114, 2010, pp. 942-951.

Krishnan, et al., "Dark Flash Photography", SIGGRAPH '09, Jul. 2009, 11 pages.

Legendre, et al., "DeepLight: Learning Illumination for Unconstrained Mobile Mixed Reality", CVPR 2019, pp. 5918-5928.

Liang, et al., "Better Together: Shading Cues and Multi-View Stereo for Reconstruction Depth Optimization", IEEE Access, vol. 8, Jun. 17, 2020, pp. 112348-112356.

Qiu, et al., "Towards Geometry Guided Neural Relighting with Flash Photography", 2020 International Conference on 3D Vision (3DV), 12 pages.

Raskar, et al., "Non-photorealistic Camera: Depth Edge Detection and Stylized Rendering using Multi-Flash Imaging", ACM Transactions on Graphics, vol. 23, No. 3, Aug. 2004, pp. 679-688.

Ruefenacht, et al., "Automatic and Accurate Shadow Detection using Near-Infrared Information", IEEE Transactions on Pattern Analysis and Machine Intelligence, vol. 36, No. 8, Aug. 2014, 8 pages.

Salamati, et al., "Incorporating Near-Infrared Information into Semantic Image Segmentation", Computer Vision and Pattern Recognition, arXiv:1406.6147v1, Jun. 24, 2014, 16 pages.

Santo, et al., "Deep Photometric Stereo Networks for Determining Surface Normal and Reflectances", IEEE Transactions on Pattern Analysis and Machine Intelligence, vol. 44, No. 1, Jan. 2022, pp. 114-128.

Sanyal, et al., "Learning to Regress 3D Face Shape and Expression from an Image without 3D Supervision", CVPR 2019, pp. 7763-7772.

Sengupta, et al., "SfSNet: Learning Shape, Reflectance and Illuminance of Faces in the Wild", CVPR 2018, Apr. 19, 2018, 23 pages.

Shu, et al., "Portrait Lighting Transfer Using a Mass Transport Approach", ACM Transactions on Graphics, vol. 37, No. 1, Oct. 2017, 15 pages.

Suarez, et al., "Infrared Image Colorization Based on a Triplet DCGAN Architecture", CVPR 2017, pp. 18-23.

(56) References Cited

OTHER PUBLICATIONS

Sun, et al., "Single Image Portrait Relighting", ACM Trans. Graph, vol. 38, No. 4, Article 79, Jul. 2019, 12 pages.
Tran, et al., "Extreme 3D Face Reconstruction: Seeing Through Occlusions", CVPR 2018, pp. 3935-3944.
Wang, et al., "Video Relighting Using Infrared Illumination", EUROGRAPHICS 2008, vol. 27, No. 2, 2008, 9 pages.
Xu, et al., "Deep Image-Based Relighting From Optimal Sparse Samples", ACM Transactions on Graphics, vol. 37, No. 4, Article 126, Aug. 2018, 13 pages.
Zeng, et al., "DF2Net: A Dense-Fine-Finer Network for Detailed 3D Face Reconstruction", ICCV 2019, pp. 2315-2324.
Zhang, et al., "Portrait Shadow Manipulation", ACM Transactions on Graphics, vol. 39, No. 4, Article 78, Jul. 2020, 14 pages.
Zhou, et al., "Deep Single-Image Portrait Relighting", Proceedings of the IEEE/CVF International Conference on Computer Vision (ICCV), Oct. 2019, pp. 7194-7202.
International Search Report and Written Opinion for PCT Application No. PCT/US2021/072300, mailed on Mar. 7, 2022, 12 pages.
Luo, et al., "NIID-Net: Adapting Surface Normal Knowledge for Intrinsic Image Decomposition in Indoor Scenes", IEEE Transactions on Visualization and Computer Graphics, vol. 26, No. 12, Dec. 2020, pp. 3434-3445.
Qiu, et al., "Towards Geometry Guided Neural Relighting With Flash Photography", arXiv.org, Cornell University Library, Aug. 12, 2020, 12 pages.
Yoon, et al., "Fine-Scale Surface Normal Estimation Using a Single NIR Image", arXiv:1603.07475v1, Cornell University Library, Mar. 24, 2016, 15 pages.

\* cited by examiner

DARK FLASH NORMAL CAMERA

CROSS-REFERENCE TO RELATED APPLICATIONS

This application is a 35 U.S.C. § 371 National Phase Entry Application from PCT/US2021/072300, filed on Nov. 9, 2021, entitled "A DARK FLASH NORMAL CAMERA", which claims the benefit of U.S. Provisional Patent Application No. 63/198,736, filed on Nov. 9, 2020, entitled "A DARK FLASH NORMAL CAMERA," and also claims the benefit of U.S. Provisional Patent Application No. 63/198,836, filed on Nov. 16, 2020, entitled "A DARK FLASH NORMAL CAMERA," the disclosures of which are incorporated by reference herein in their entirety.

TECHNICAL FIELD

This description relates to performing a relighting of an image taken in poorly lit conditions in, for example, mobile photography and videography applications.

BACKGROUND

Some mobile photography and videography are often performed under poor, uncontrolled lighting that results in low quality images and degrades the performance of downstream image processing and computer vision algorithms. Controlling the visible lighting in the environment or supplementing it with a flash is often too difficult or too disruptive to be practical.

SUMMARY

Implementations described herein are related to estimating a high-quality normal map and albedo map of scenes depicting people (faces and torsos) in poor-quality lighting conditions by supplementing the available visible-spectrum illumination with a single near infrared light source and camera, i.e., a so-called dark flash image. The implementations herein take as input a single-color image captured under arbitrary visible lighting and a single dark flash image captured under controlled NIR lighting at the same perspective, and compute a normal map and albedo map of the scene. Since ground truth normal maps of faces are difficult to capture, the implementations herein include a novel training technique that combines information from multiple noisy sources, specifically stereo and photometric shading cues. The performance of the implementations is evaluated over a range of subjects and lighting conditions.

In one general aspect, a method can include receiving image training data representing a plurality of color (RGB) images and a plurality of near-infrared (NIR) images, each of the plurality of RGB images being captured with a visible spectrum illumination source, each of the plurality of NIR images being captured with a NIR illumination source, the plurality of RGB images and the plurality of NIR images including, respectively, subsets of the plurality of RGB images and subsets of the plurality of NIR images, each subset of the plurality of RGB images and each subset of the plurality of NIR images including an image of a respective subject of a set of subjects in a pose through a plurality of illumination conditions. The method can also include generating a prediction engine based on the image training data, the prediction engine being configured to produce an estimated surface normal map of a user and an estimated reflectance map of the user from a single RGB image of the user and a single NIR image of the user, the single RGB image of the user and the single NIR image of the user being captured within a time period less than a threshold time period from perspectives different by less than a threshold perspective.

In another general aspect, a computer program product comprises a non-transitory storage medium, the computer program product including code that, when executed by processing circuitry of a computing device, causes the processing circuitry to perform a method. The method can include receiving image training data representing a plurality of color (RGB) images and a plurality of near-infrared (NIR) images, each of the plurality of RGB images being captured with a visible spectrum illumination source, each of the plurality of NIR images being captured with a NIR illumination source, the plurality of RGB images and the plurality of NIR images including, respectively, subsets of the plurality of RGB images and subsets of the plurality of NIR images, each subset of the plurality of RGB images and each subset of the plurality of NIR images including an image of a respective subject of a set of subjects in a pose through a plurality of illumination conditions. The method can also include generating a prediction engine based on the image training data, the prediction engine being configured to produce an estimated surface normal map of a user and an estimated reflectance map of the user from a single RGB image of the user and a single NIR image of the user, the single RGB image of the user and the single NIR image of the user being captured within a time period less than a threshold time period from perspectives different by less than a threshold perspective.

In another general aspect, an electronic apparatus comprises memory and controlling circuitry coupled to the memory. The controlling circuitry can be configured to receive image training data representing a plurality of color (RGB) images and a plurality of near-infrared (NIR) images, each of the plurality of RGB images being captured with a visible spectrum illumination source, each of the plurality of NIR images being captured with a NIR illumination source, the plurality of RGB images and the plurality of NIR images including, respectively, subsets of the plurality of RGB images and subsets of the plurality of NIR images, each subset of the plurality of RGB images and each subset of the plurality of NIR images including an image of a respective subject of a set of subjects in a pose through a plurality of illumination conditions. The controlling circuitry can also be configured to generate a prediction engine based on the image training data, the prediction engine being configured to produce an estimated surface normal map of a user and an estimated reflectance map of the user from a single RGB image of the user and a single NIR image of the user, the single RGB image of the user and the single NIR image of the user being captured within a time period less than a threshold time period from perspectives different by less than a threshold perspective.

The details of one or more implementations are set forth in the accompanying drawings and the description below. Other features will be apparent from the description and drawings, and from the claims.

DETAILED DESCRIPTION

Figure 1:
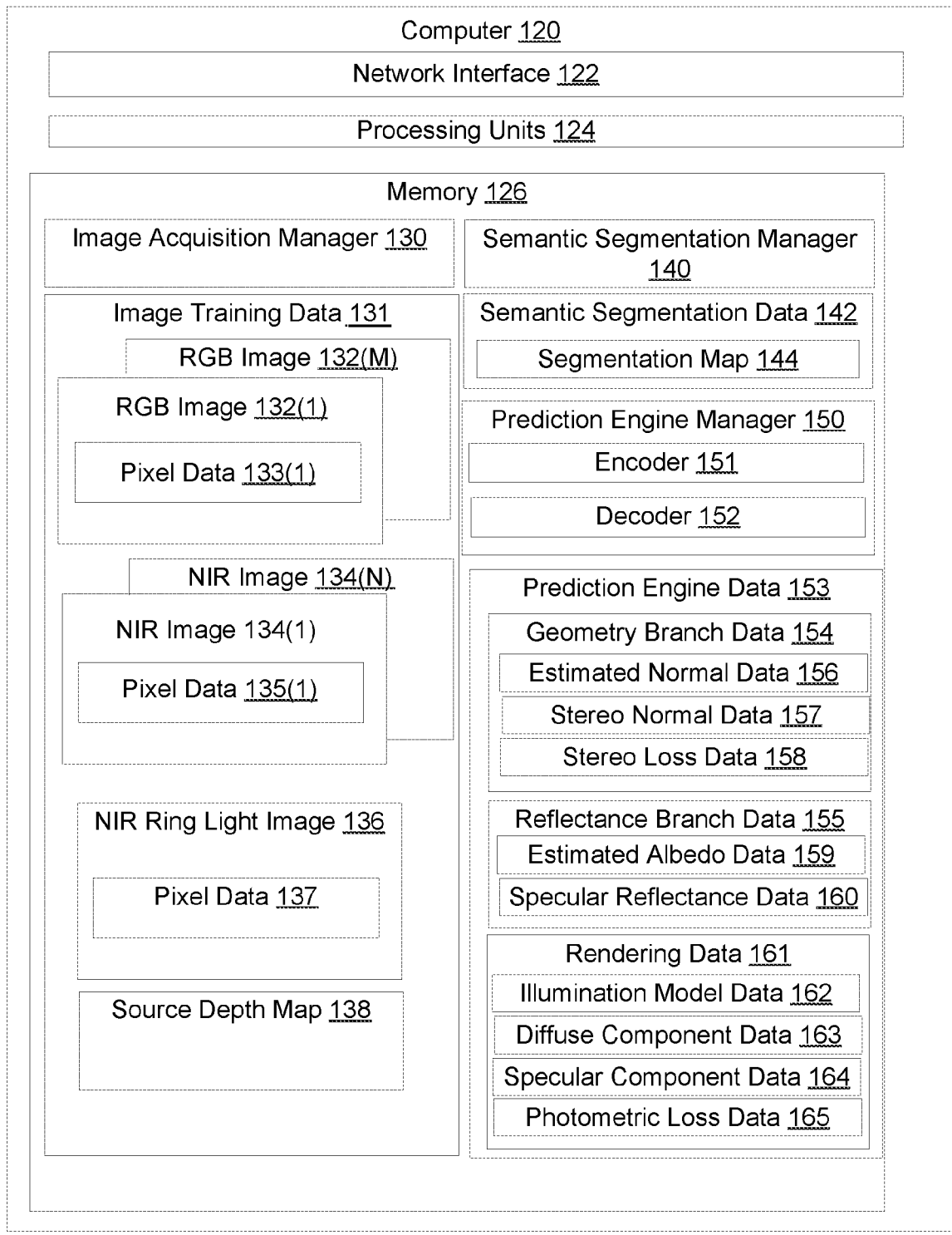
FIG. 1 is a diagram that illustrates an example electronic environment in which improved techniques described herein may be implemented.

Some conventional approaches to relighting poorly-lit images include performing a "shape-from-shading" operation on a color image, which recovers a shape from a gradual variation in shading in the image. Other conventional approaches to relighting poorly-lit images include an intrinsic image decomposition technique, in which an image is factorized as a product of a reflectance image and a shading image.

A technical problem with the above-described conventional approaches to relighting poorly illuminated images is that such approaches are not well-suited to estimating a map of surface normals and albedo of a surface in an image used in image relighting. For example, using either of these techniques to determine an image relighting may result in an effectively untractable problem for estimating surface normal and albedo maps. While these techniques may be made more tractable with an availability of a ground truth reflectance map, such a ground truth map may not be available in many mobile photography situations.

In accordance with the implementations described herein, a technical solution to the above-described technical problem includes using, in addition to an RGB image of a subject of a set of subjects, an image illuminated with near-infrared (NIR) radiation to determine albedo and surface normal maps for performing an image relighting, the image being captured with the NIR radiation from essentially the same perspective from which the RGB image was captured. In some implementations, a prediction engine takes as input a single RGB image and a single NIR image and estimates surface normals and reflectance from the subject. In some implementations, the reflectance includes an albedo component and a specular component.

In some implementations, the improved techniques include receiving image training data representing a plurality of color (RGB) images and a plurality of near-infrared (NIR) images, each of the plurality of RGB images being captured with a white light illumination source, each of the plurality of NIR images being captured with a NIR illumination source, the plurality of RGB images and the plurality of NIR images including, respectively, subsets of the plurality of RGB images and subsets of the plurality of NIR images, each subset of the plurality of RGB images and each subset of the plurality of NIR images including an image of a respective subject of a set of subjects in a pose through a plurality of illumination conditions; and generating a prediction engine based on the image training data, the prediction engine being configured to produce an estimated surface normal map of a user and an estimated reflectance map of the user from a single RGB image of the user and a single NIR image of the user, the single RGB image of the user and the single NIR image of the user being captured simultaneously from essentially identical perspectives.

In some implementations, prior to generating the prediction engine, the improved techniques include performing, for each of a set of subjects, a semantic segmentation operation on an RGB image of a corresponding subset of the plurality of RGB images to produce a label image for that subject, the label image having a specified number of classes into which each of a plurality of pixels of the RGB image is categorized, the label image for that subject being included in the image training data.

In some implementations, the single RGB image of the user and the single NIR image of the user are captured essentially simultaneously. In some implementations, in this scenario, RGB illumination used in the image capture need not be generated by the RGB illumination source but can be generated with any arbitrary lighting.

In some implementations, each subset of the plurality of RGB images and each subset of the plurality of NIR images are captured using an image capture arrangement, the image capture arrangement including, respectively, a plurality of RGB sources, a plurality of NIR illumination sources, and RGB and NIR illumination detectors, the plurality of co-located RGB and NIR illumination sources being arranged in a geometrical pattern surrounding the RGB and NIR illumination detectors. In some implementations, the plurality of RGB sources and the plurality of NIR illumination sources are arranged in corners of a rectangle surrounding the RGB and NIR illumination detectors. In some implementations, each of the plurality of illumination conditions includes one of the plurality of RGB illumination sources and one of the plurality of NIR illumination sources producing illumination, and all other of the plurality of RGB illumination sources and all of the other of the plurality of NIR illumination sources not producing illumination. In some implementations, the RGB and NIR illumination detectors include a first NIR camera, a second NIR camera, and an RGB camera, the first NIR camera being and the RGB camera being misaligned by an amount less than a specified misalignment threshold. In some implementations, the image capture arrangement further includes a NIR dot projector configured to project a dot speckle pattern on the subject, the dot speckle pattern being temporally interleaved with illumination emitted by an NIR illumination source of the plurality of NIR illumination sources.

In some implementations, the prediction engine includes a first branch and a second branch, the first branch configured to generate surface normal maps, the second branch configured to output predicted reflectance maps. In some implementations, the prediction engine includes a neural network having a unet encoder-decoder architecture with skip level connections, the unet encoder-decoder architecture including an encoder and decoder, the encoder including a set of blocks, each of the set of blocks including a set of convolution layers and a set of ReLU activation layers, the decoder being configured to output surface normal maps in the first branch and predicted reflectance maps in the second branch. In some implementations, generating the prediction engine includes generating the photometric loss based on a rendering from the estimated surface normal map and the estimated reflectance map under an illumination condition of the plurality of illumination conditions. In some implementations, the estimated reflectance map includes a diffuse component and a specular component, and generating the photometric loss includes using a Lambertian reflectance model to generate a diffuse component of the estimated reflectance map and using a Blinn-Phong bidirectional reflectance distribution function (BRDF) to generate a specular component of the estimated reflectance map. In some implementations, generating the photometric loss includes generating a binary shadow map based on a stereo depth map and a position of a light source used in generating an RGB image of the plurality of RGB images, generating an observed intensity map based on the estimated reflectance map, and generating, as the photometric loss, a Hadamard product of the binary shadow map and a difference between the observed intensity map and the RBG image. In some implementations, the improved techniques further include acquiring a stereo depth map, performing a smoothing operation on the stereo depth map to produce a smoothed stereo depth map, and generating a stereo loss based on the estimated surface normal map and gradients of the smoothed stereo depth map. In some implementations, generating the stereo loss includes generating, as an L1 vector loss, an L1 norm of a difference between the estimated surface normal map and the gradients of the smoothed stereo depth map, generating, as an angular loss, an inner product of the estimated surface normal map and the gradients of the smoothed stereo depth map, and generating, as the stereo loss, a difference between the L1 vector loss and the angular loss.

A technical advantage of disclosed implementations is that application of the improved techniques, unlike the conventional approaches, result in a tractable problem for determining albedo and surface normal maps used in image relighting. Reducing the problem of generating such maps to a tractable problem provides a robust solution to the above-described image relighting problem when the images are taken under poor lighting conditions.

Moreover, this robust solution is provided when there is no ground truth available because of the novel predictor engine that uses NIR illumination in addition to the conventional visible spectrum illumination. It is noted that many mobile devices have the capability to take pictures using both visible spectrum illumination and NIR illumination, and these are taken from the same orientation. In addition, such visible spectrum and NIR-illuminated images may be acquired essentially simultaneously.

FIG. 1 is a diagram that illustrates an example electronic environment 100 in which the above-described technical solution may be implemented. The computer 120 is configured to train and operate a prediction engine configured to estimate surface normal and reflectance from image data.

The computer 120 includes a network interface 122, one or more processing units 124, and memory 126. The network interface 122 includes, for example, Ethernet adaptors, Token Ring adaptors, and the like, for converting electronic and/or optical signals received from the network to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some implementations, one or more of the components of the computer 120 can be, or can include processors (e.g., processing units 124) configured to process instructions stored in the memory 126. Examples of such instructions as depicted in FIG. 1 include an image acquisition manager 130, a semantic segmentation manager 140, and a prediction engine manager 150. Further, as illustrated in FIG. 1, the memory 126 is configured to store various data, which is described with respect to the respective managers that use such data.

The image acquisition manager 130 is configured to receive image training data 131. In some implementations, the image acquisition manager 130 receives the image training data 131 over the network interface 122, i.e., over a network (such as network 190) from the display device 170. In some implementations, the image acquisition manager 130 receives the image training data 131 from local storage (e.g., a disk drive, flash drive, SSD, or the like).

In some implementations, the image acquisition manager 130 is further configured to crop and resize facial images from image training data 131 to produce portraits in a standard size. By cropping and resizing the images to a standard size so that the face of each subject is in about the same position, the training of the prediction image is made more robust.

The image training data 131 represents a set of facial images under different lighting conditions, in the same pose. The different lighting conditions include light type (e.g., visible spectrum/RGB and NIR) and light position with respect to a subject. An example acquisition of images under such conditions is discussed in more detail with regard to FIG. 3. In some implementations, RGB color channels may be replaced by other color channels, e.g., YUV, Y'UV, YCbCr, Y'IQ.

As shown in FIG. 1, the image training data 131 includes multiple RGB images 132(1), . . . 132(M), where M is the number of RGB images in the image training data 131. Each RGB image, say, image 132(1) includes pixel data 133(1) indicating intensity and/or color per pixel.

As also shown in FIG. 1, the image training data 131 includes multiple NIR images 134(1), . . . 134(N), where M is the number of NIR images in the image training data 131. Each NIR image, say, image 134(1) includes pixel data 135(1) indicating intensity per pixel. In some implementations, N=M.

In some implementations, the image training data 131 includes a NIR ring light image 136. In some implementations, the NIR ring light image 136 is taken using a NIR ring light source surrounding a NIR detector (e.g., camera). This image taken is with the same pose as used in the images 131(1 . . . M). In some implementations, the NIR ring light image 136 is taken using a NIR light source that is not surrounding an NIR detector but is rather in proximity to the NIR detector, i.e., off to the side. In such implementations, the NIR ring light may have a shape other than a ring, i.e., a small disk, a square, etc.

In some implementations, the image training data 131 includes a source depth map 138, which represents an image of a person as a set of distances from a light source to that person's surface. Such a depth image 138 may be taken essentially simultaneously with the RBG images 131(1 . . . M) and/or NIR images 133(I . . . N), and at the same pose. In some implementations, the source depth map 138 is a stereo depth map, taken using stereo dot projectors as the RGB images are acquired; further details are discussed in FIG. 3.

The semantic segmentation manager 140 is configured to perform a semantic segmentation operation on at least one of the RGB images 132(1 . . . M) to produce semantic segmentation data 142. In some implementations, the sematic segmentation operation involves using a neural network with convolutional hidden layers and an output segmentation layer. In some implementations, the sematic segmentation operation involves using an encoder/decoder structure where the spatial resolution of the input is downsampled, developing lower-resolution feature mappings which are learned to be highly efficient at discriminating between classes; the feature representations may then be upsampled into a full-resolution segmentation map.

The semantic segmentation data 142 represents a semantic segmentation of an image into a specified number of classes, i.e., a segmentation map 144. Such a segmentation map 144 may be used as an auxiliary input into a prediction engine for helping the engine determine image shape and reflectance. In some implementations, the segmentation is a 6-class segmentation, i.e., there are six classes of pixels in each segmentation map.

The prediction engine training manager 150 represents a prediction engine is configured to generate prediction engine data 153, which represents data generated by the prediction engine manager 150 produce surface normal and reflectance maps of images illuminated with visible spectrum and NIR illumination. In some implementations, the prediction engine manager 150 is configured to perform training operations on the image training data 131 as well as implementing a loss function tailored to minimize losses of quantities relevant to generating surface normal and reflectance maps from visible spectrum/RGB images and NIR images. As shown in FIG. 1, the prediction engine manager includes an encoder 151 and a decoder 152.

In some implementations, the prediction engine includes a neural network having a unet encoder-decoder architecture with skip level connections, the unet encoder-decoder architecture including the encoder 151 and decoder 152. In such an implementation, the encoder 151 includes a set of blocks, each of the set of blocks including a set of convolution layers and a set of ReLU activation layers.

The encoder 151 is configured to take as input the image training data 131 to produce parametric values in a fully connected layer to be input into the decoder 152. The decoder 152 is configured to take as input the parametric values produced by the encoder 151 and produce the prediction engine data 153. For example, the encoder 151 takes in RGB images 132(1 . . . M), NIR images 134(1 . . . N), sematic segmentation data 142, and source depth map 138, and produces intermediate quantities that are used by the decoder 152 to produce estimated surface normals (e.g., estimated normal data 156). The cost function in this case reflects, e.g., a difference between the estimated normal data 156 and surface normals of the same subject and pose obtained another way, e.g., using stereo images of thew subject. Further details about the stereo imaging are described with regard to FIG. 3.

The prediction engine as represented by the prediction engine manager 150 is configured to produce not only estimated surface normals of a subject from RGB and NIR images, but also estimated reflectance maps of the subject from those images. To effect this estimation of both surface normals and reflectance maps, the decoder 152 is configured to output surface normal maps in a geometry branch and reflectance maps in a reflectance branch.

The prediction engine data 153 represents data generated by the prediction engine manager 150 produce surface normal and reflectance maps of images illuminated with visible spectrum and NIR illumination. As shown in FIG. 1, the prediction engine data 153 includes geometry branch data 154, reflectance branch data 155, and rendering data 161.

The geometry branch data 154 includes data relevant to estimating surface normals of a subject in RGB and NIR images. The decoder 152 is configured to output estimated normal data 156, representing the surface normals, as a vector map, i.e., a three-dimensional vector at each pixel classified as the subject, on the pixels associated with the surface of the subject.

In training the prediction engine, however, the estimated normal data 156 is but one component of the prediction engine training. In order to effect the training, a loss function is needed. In this case, the loss function is defined using both the estimated normal data 156 and reference data. As shown in FIG. 1, the reference data includes stereo normal data 157; in some implementations, the stereo normal data 157 includes, or is, the source depth map 138. The prediction engine manager 150 is configured to generate stereo loss data 158 based on the estimated normal data 156 and the stereo normal data 157.

The reflectance branch data 155 includes data relevant to estimating reflectance component data from the surface of an image of a person. For example, the reflectance can include an albedo component and a specular reflectance component. Albedo is defined as a diffuse reflectance, i.e., a ratio of diffuse radiant flux emitted by a surface to irradiance received by the surface; this is in contrast to specular radiant flux reflected by the surface. Accordingly, as shown in FIG. 1, the reflectance branch data 155 includes estimated albedo data 159 and estimated specular reflectance data 160.

The prediction engine uses the reflectance branch data 155 to estimate another component of loss for training the prediction engine: photometric loss. The prediction engine estimates photometric loss by applying rendering models to the reflectance component maps represented by the estimated albedo data 159 and estimated specular reflectance data 160 to produce diffuse and specular image layers of an image that, when added, result in an estimated image of the subject. The photometric loss is defined as a difference between the estimated image and one of the input images 132(1 . . . M) or 134(1 . . . N). By optimizing the photometric and stereo losses, the prediction engine acts as an image formation model connecting its outputs to images of a scene taken under known point lighting.

Accordingly, the rendering data 161 includes illumination model data 162 representing radiometric reflectance models that connect the output of the decoder 152 with images taken under known lighting conditions. For example, a reflectance function $f$ is introduced that gives a ratio of reflected light to incident light for a particular unit-length light vector $\mathbf{l}$, view vector $\mathbf{v}$, surface normal $\mathbf{n}$, four-channel (RGB+NIR) albedo $a$, scalar specular intensity $p$, and specular exponent $m$ as follows:

$$f(l, v, n) = \alpha + \rho \frac{m+2}{2\pi}(n \cdot h)^m, \quad (1)$$

where $h=(n+l)/\|n+l\|$. The observed intensity at a pixel due to a point light is given by $$I = f(l,v,n)(n \cdot l)L, \quad (2)$$

where $L$ is a light intensity. The reflected intensity is not observed from enough unique light directions at each pixel to estimate all of the parameters in Eq. (1). In some implementations, to address this issue the specular exponent is specified to be $m=30$ based on prior measurements of human skin and our own observations, and estimate only n, α, and ρ. The geometric quantities l and v, and light intensity L are determined by calibration procedures.

In this context, the geometry branch predicts, as the estimated normal data 156, a normal map ñ, and the reflectance branch predicts, as the estimated albedo data 159 and the secular reflectance data 160, respectively, an albedo map $\tilde{\alpha}$ and log-scale specular intensity map, $\log(\tilde{\rho})$. Rather than relying on ground truth normals or reflectance data to supervise the training of the prediction engine, the above-described stereo loss data 158 and the photometric loss data 165 are combined.

The stereo loss represented by the stereo loss data 158 combines an L1 vector loss and an angular loss as follows:

$$\mathfrak{L}_s(\tilde{n}) = \|\tilde{n} - n_s\|_1 - (\tilde{n} \cdot n_s), \tag{3}$$

where $n_s$ represents a gradient of a smoothed version of the stereo depth map.

The photometric loss represented by the photometric loss data 165 is computed between each of the RGB images 132(1 ... M) and/or the NIR images 134(1 ... N) rendered according to Eq. (2) and outputs of the prediction engine for the corresponding lighting conditions as follows:

$$\mathfrak{L}_p^j(\tilde{n}, \tilde{\alpha}, \tilde{\rho}) = \|S_j \odot (I(l_j, v, \tilde{n}, \tilde{\alpha}, \tilde{\rho}) - \tilde{I}_j)\|_1, \tag{4}$$

where $\tilde{I}_j$ is the per-pixel color observed in the $j^{th}$ image, and $S_j$ is a binary shadow map computed using the stereo depth map data 138 and a calibrated light position. One may apply a prior to the albedo map that encourages piecewise constant variation:

$$\mathfrak{L}_c(\tilde{\alpha}) = \sum_i \sum_{j \in \mathcal{N}(i)} \|\tilde{\alpha}_i - \tilde{\alpha}_j\|_1, \tag{5}$$

where $\mathcal{N}(i)$ represents a 5×5 neighborhood centered at pixel i. This prior may be applied to pixels classified as clothing, body, or arms in the semantic segmentation map 144.

The total loss function is a weighted sum of the above loss terms:

$$\mathfrak{L}(\tilde{n}, \tilde{\alpha}, \tilde{\rho}) = \mathfrak{L}_s(\tilde{n}) + \lambda_p \sum_j \mathfrak{L}_p^j(\tilde{n}, \tilde{\alpha}, \tilde{\rho}) + \lambda_c \mathfrak{L}_c(\tilde{\alpha}), \tag{6}$$

where weights $\lambda_p$ and $\lambda_c$ are specified as values, e.g., in some implementations $\lambda_p=10$ and $\lambda_c=50$.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1, including combining functionality illustrated as two components into a single component.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the computer 120 can be, or can include, processors configured to process instructions stored in a memory. For example, an image acquisition manager 130 (and/or a portion thereof) and a prediction image training manager 140 (and/or a portion thereof can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the VR server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the computer 120. As illustrated in FIG. 1, the memory 126 is configured to store various data, including image training data 131, semantic segmentation data 136 and prediction engine data 153.

Figure 2:
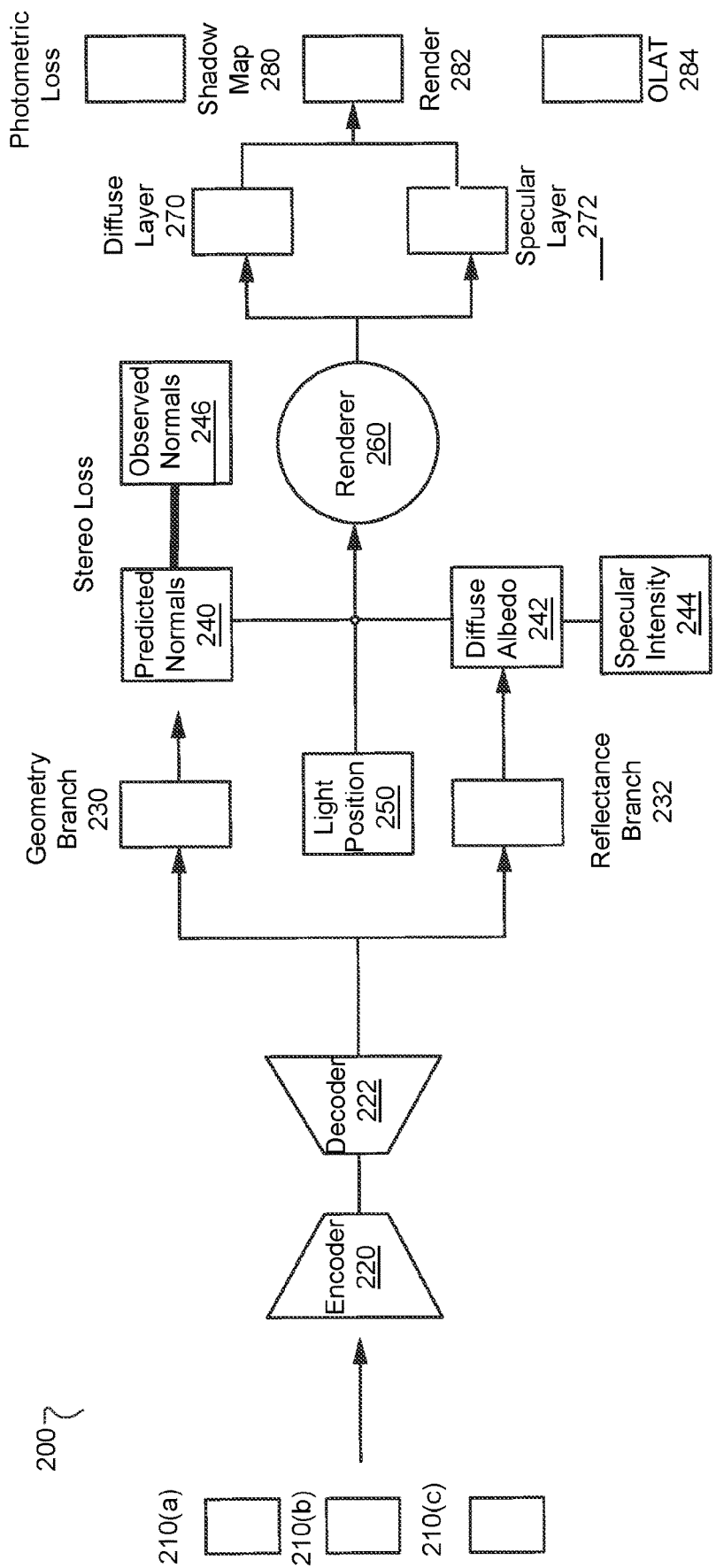
FIG. 2 is a diagram that illustrates an example prediction engine configured to estimate surface normals and reflectance in an image.

FIG. 2 is a diagram that illustrates an example prediction engine 200 configured to estimate surface normals and reflectance in an image. As shown in FIG. 2, the prediction engine 200 includes an encoder 220, a decoder 222, a geometry branch 230, a reflectance branch 232, and a renderer 260. The prediction engine 200 as shown in FIG. 2 is a standard UNet with skip connections.

The encoder 220 accepts as input a single RBG image 210(a) and a single NIR image 210(b), and a label image 210(c) generated from the semantic segmentation map 144 as discussed with regard to FIG. 1. In some implementations, the RGB image 210(a) and the NIR image 210(b) are taken essentially simultaneously. For example, a cell phone camera may have both a visible spectrum illumination source (i.e., a camera flash) and a NIR source (a different flash on the cell phone) that are activated by a user at the same time. Accordingly, the images/maps 210(*a,b,c*) represents a user in the same pose.

The encoder 220 and the decoder 222 each consist of five blocks, with each block having three convolutional layers. A bottleneck has 256 channels. As shown in FIG. 2, the output of the decoder 222 is fed into two branches: the geometry branch 230 and the reflectance branch 232. As stated above, the geometry branch 230 estimates the surface normal map (i.e., predicted normals) 240 ñ and the reflectance branch 232 estimates the albedo map 242 $\bar{\alpha}$ and log-scale specular intensity map 244, $\log(\bar{\rho})$. Both the geometry branch 230 and the reflectance branch 232 have three convolutional layers with 32 channels and one final output layer.

During training, the prediction engine 200 uses the predicted normals 240 and observed normals 242 to produce the stereo loss. The observed normals 242 may be taken from a stereo depth map that is input along with the images 210(*a, b,c*) and is acquired with training data.

During training, the prediction engine 200 uses a diffuse layer 270, a specular layer 272, a shadow map 280 (i.e., $S_j$ in Eq. (4)), and a one-light-at-a-time (OLAT) image 284 input into the prediction engine 200 as part of the training to produce the photometric loss. The prediction engine 200 generates the layers 270 and 272 based on the positions 250 of the lights used in generating the OLAT 284 and diffuse and specular light rendering models in a renderer 260, e.g., Eq. (1). The prediction engine 200 applies light position 250 and renderer 260 to the predicted normals 240, the diffuse albedo map 242, and the specular intensity map 244 to produce the diffuse layer 270 and specular layer 272. A sum of the diffuse layer 270 and the specular layer 272 produces the rendered image 282, which with the OLAT 284 and the shadow map 280 produces the photometric loss.

Figure 3:
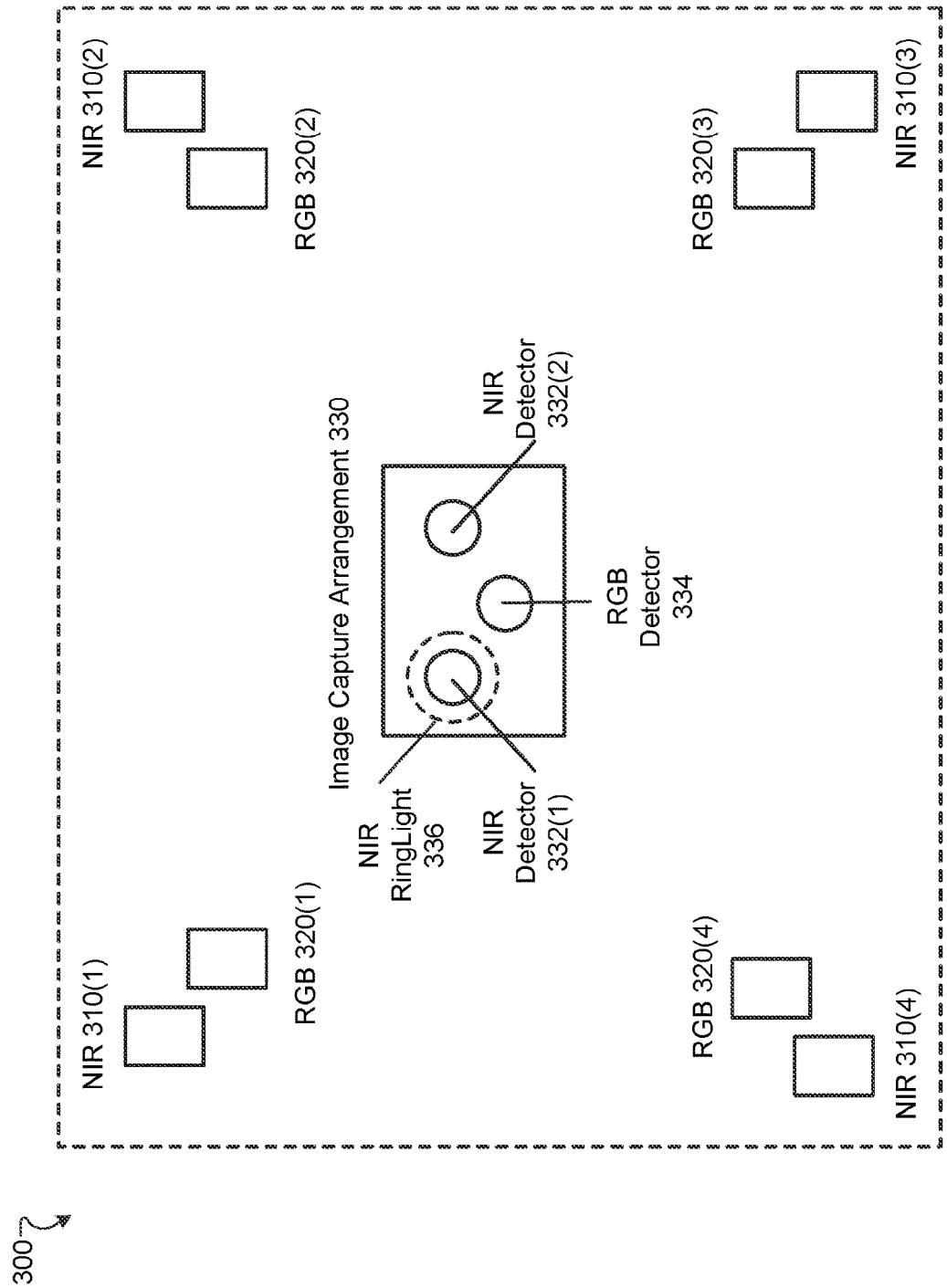
FIG. 3 is a diagram that illustrates an example system for generating RGB and NIR images for training the prediction engine.

FIG. 3 is a diagram that illustrates an example system 300 for generating RGB and NIR images for training the prediction engine. The system 300 includes a plurality of NIR illumination sources 310(1,2,3,4) and a plurality of RGB sources 320(1,2,3,4) and an image capture arrangement 330.

As shown in FIG. 3, the plurality of NIR illumination sources 310(1,2,3,4) and the plurality of RGB sources 320(1,2,3,4) are arranged in corners of a rectangle at which the image capture arrangement 330 is at the center. In some arrangements, the number of NIR illumination sources is different form the number of RGB sources. In some implementations, NIR illumination sources and RGB sources are arranged in a different geometrical pattern, e.g., at the vertices of a polygon, in a circle or ellipse, along a line, or the like.

The image capture arrangement 330, as shown in FIG. 3, includes a pair of NIR detectors (e.g., cameras) 332(1,2), a NIR ring light 336 surrounding the NIR detector 332(1), and an RGB detector 334. In some implementations, the NIR ring light 336 may be placed in another location in the vicinity of the NIR detector 332(1). In some implementations, the NIR ring light 336 may be replaced with a NIR illumination source of a different shape, e.g., a disk. In some implementations, the image capture arrangement 330 also includes a pair of NIR stereo dot projectors configured to project a series of dots onto a subject to generate stereo normals.

Ideally, RGB images and NIR images are taken simultaneously and from the same perspective so that training images of a subject will all have the same pose. Nevertheless, because the sources may not be timed precisely together or co-located, there may be small differences in the time at which the images are taken and their perspectives. The time difference is, in some implementations, smaller than a time threshold. In some implementations, the time threshold corresponds to a single frame in a video (e.g., 1/60 second with 60 fps or 1/24 second with 24 fps).

As an example, the RGB detector 334 may be a 7.0 MP RGB camera that operates at 66.67 fps with a stereo pair of 2.8 MP NIR cameras that operate at 150 fps. The RGB camera and one of the NIR cameras are co-located using a plate beamsplitter and a light trap. The RGB and NIR cameras of this example have a linear photometric response and all of the images may be downsampled by a factor of 2 in each dimension; a central crop may be taken that covers the face at a resolution of 960×768. Visible spectrum (RGB) lighting may be provided by 4 wide-angle LED spotlights placed at the corners of a roughly 1.5 m×0.8 m (width× height) rectangle surrounding the cameras located approximately 1.1 m from the subject. NIR lighting may be provided by 5 NIR spotlights, one adjacent to each of the visible lights, and a flash LED light located near the reference NIR camera to produce the "dark flash" input. These NIR light sources are temporally interleaved with projectors that emit NIR dot speckle patterns to assist stereo matching. A microcontroller may orchestrate triggering the lights and cameras to ensure that at any time only one visible light source and one NIR light source is active. All light sources may be calibrated for position and intensity and treated geometrically as point light sources. The light intensity term L in Eq. (2) accounts for these calibrated colors. It is noted that the NIR and visible light sources are not collocated and so slightly different values of L are used in Eq. (2) between those two conditions.

Figure 4B:
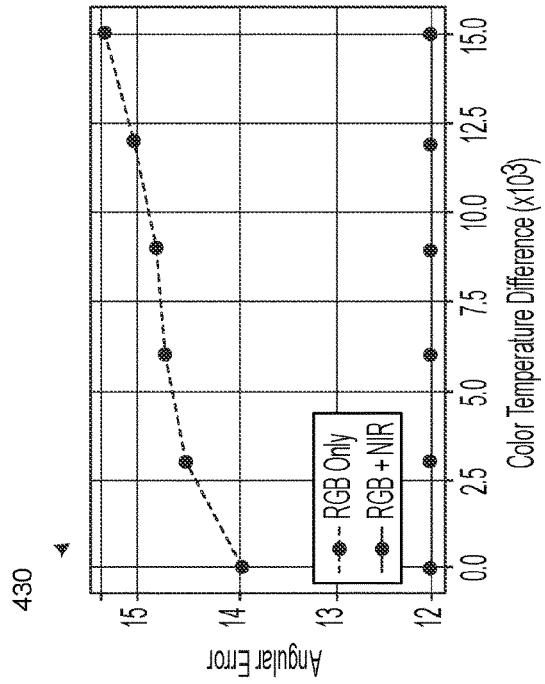
FIGS. 4A, 4B, and 4C are plots that illustrate an example effect of using NIR images in addition to RGB images on angular error.
Figure 4A:
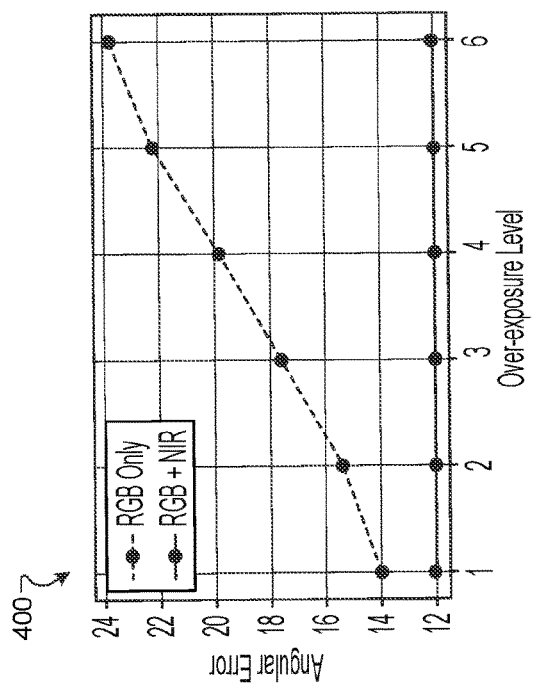
Figure 4C:
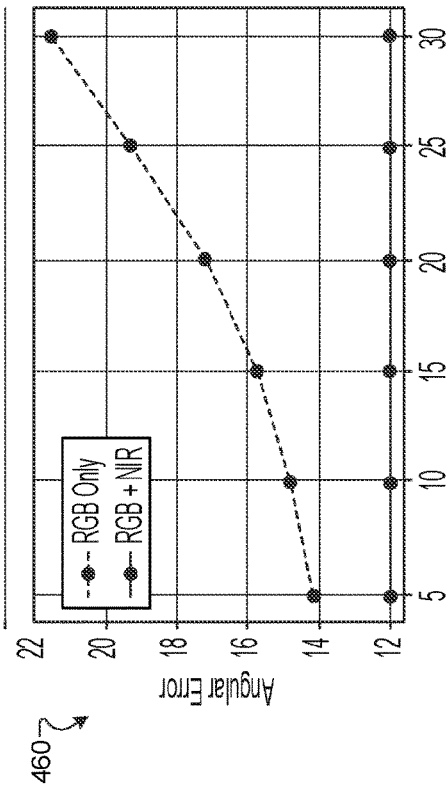

FIGS. 4A, 4B, and 4C are plots 400, 430, and 460 of curves, respectively that illustrate an example effect of using NIR images in addition to RGB images on mean angular error (i.e., $\tilde{n} \cdot n_s$ in Eq. (3)) against a baseline for the prediction engine modified to take only a single RGB image. The curves against overexposure level (400), color temperature difference (430), and noise level (460) all show increasingly large errors using RGB only, while the RGB and NIR demonstrate remarkable stability as exposure level, color temperature difference, and noise level are increased.

Figure 5:
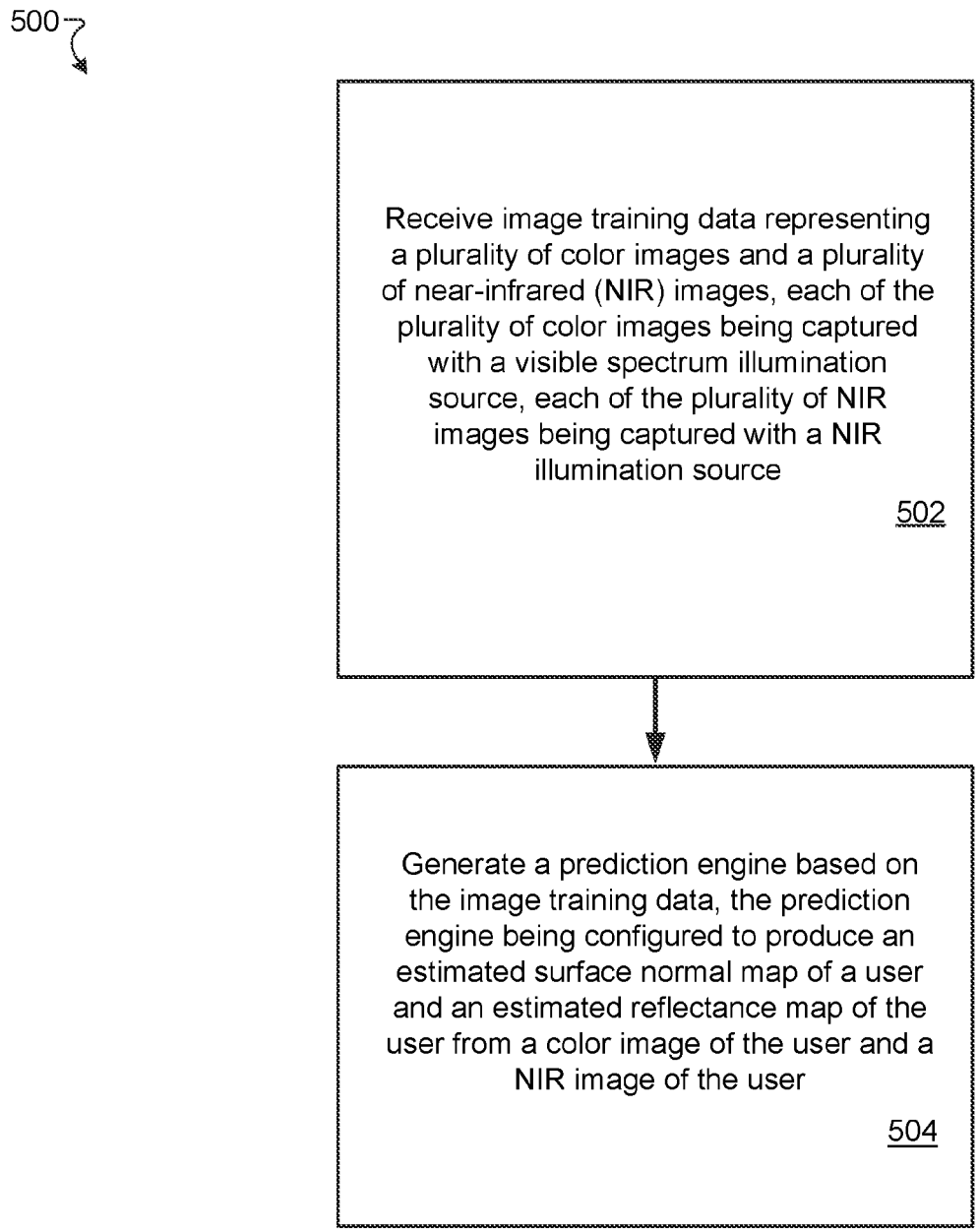
FIG. 5 is a flow chart that illustrates an example method of estimating surface normals and reflectance in an image, according to disclosed implementations.

FIG. 5 is a flow chart depicting an example method 500 of generating a relighting via surface normal and reflectance estimation according to the above-described improved techniques. The method 500 may be performed by software constructs described in connection with FIG. 1, which reside in memory 126 of the computer 120 and are run by the set of processing units 124.

At 502, the image acquisition manager 130 receives image training data (e.g., image training data 131) representing a plurality of color (RGB) images (e.g., images 132(1 . . . M)) and a plurality of near-infrared (NIR) images (e.g., images 134(1 . . . N)), each of the plurality of RGB images being captured with a visible spectrum illumination source (e.g., RGB source 334), each of the plurality of NIR images being captured with a NIR illumination source (e.g., NIR illumination source 332(1,2)), the plurality of RGB images and the plurality of NIR images including, respectively, subsets of the plurality of RGB images and subsets of the plurality of NIR images, each subset of the plurality of RBG images and each subset of the plurality of NIR images including an image of a respective subject of a set of subjects in a pose through a plurality of illumination conditions.

At 504, the prediction engine manager 150 generates a prediction engine (e.g., prediction engine data 153) based on the image training data, the prediction engine being configured to produce an estimated surface normal map (e.g., estimated normal data 156) of a user and an estimated reflectance map (e.g., estimated albedo data 159 and/or specular reflectance data 160) of the user from a single RGB image of the user and a single NIR image of the user, the single RGB image of the user and the single NIR image of the user being captured within a time period less than a threshold time period from perspectives different by less than a threshold perspective.

In some implementations, the threshold time period is less than 100 milliseconds, 10 milliseconds, 1 millisecond, or less. In some implementations, the threshold perspective is less than 10 degrees of rotation about any axis of the user, 5 degrees, 2 degrees, 1 degree, 0.5 degrees, or less.

In some implementations, the above-described prediction engine may be applied to a stereo refinement application. Stereo methods excel at measuring coarse geometry, but often struggle to recover fine-scale surface details. This can be overcome by refining stereo depths according to accurate high-resolution normals typically estimated with a photometric approach. The normals produced by our method to refine depth measurements produced by an NIR space-time stereo algorithm may be compared with using a standard bilateral filter to smooth the stereo depths. The normals generated by the improved techniques described herein produce s much higher quality reconstructions, most notably around the mouth, nose, and eyes and better recovery of fine wrinkles and creases in the skin.

In some implementations, the above-described prediction engine may be applied to a lighting adjustment to improve lighting in a portrait, e.g., by adding a virtual fill light to brighten shadowed parts of a face. Normal and reflectance maps estimated by our method may be used to render the contribution of a virtual point light located within view of the shadowed region; these maps may be combined with the original RGB image. The model provided by the prediction engine enables a convincing effect, even producing realistic specular highlights along the nasolabial folds and the tip of the nose.

Figure 6:
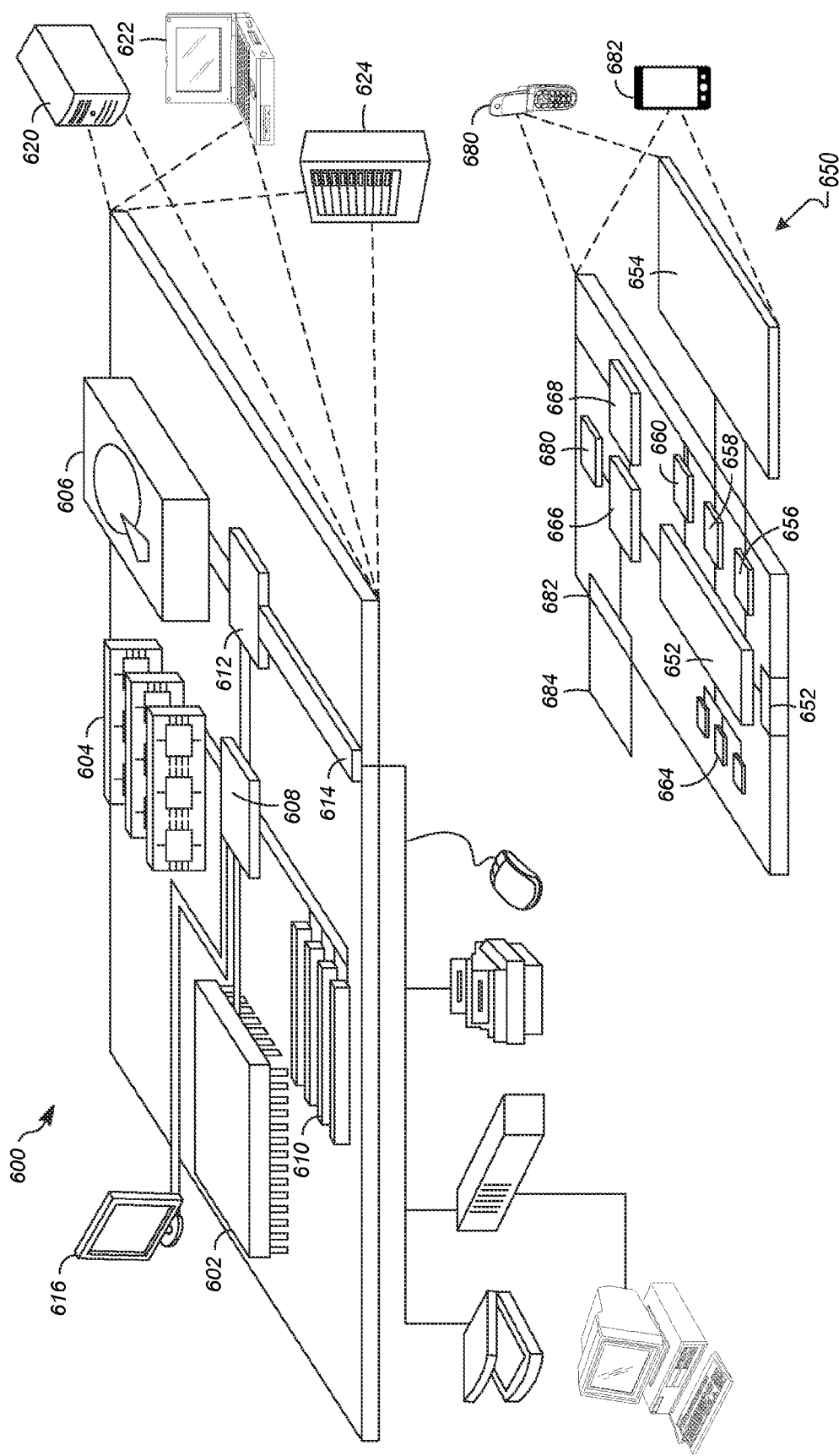
FIG. 6 is a diagram that illustrates an example of a computer device and a mobile computer device that can be used to implement the described techniques.
Figure 7:
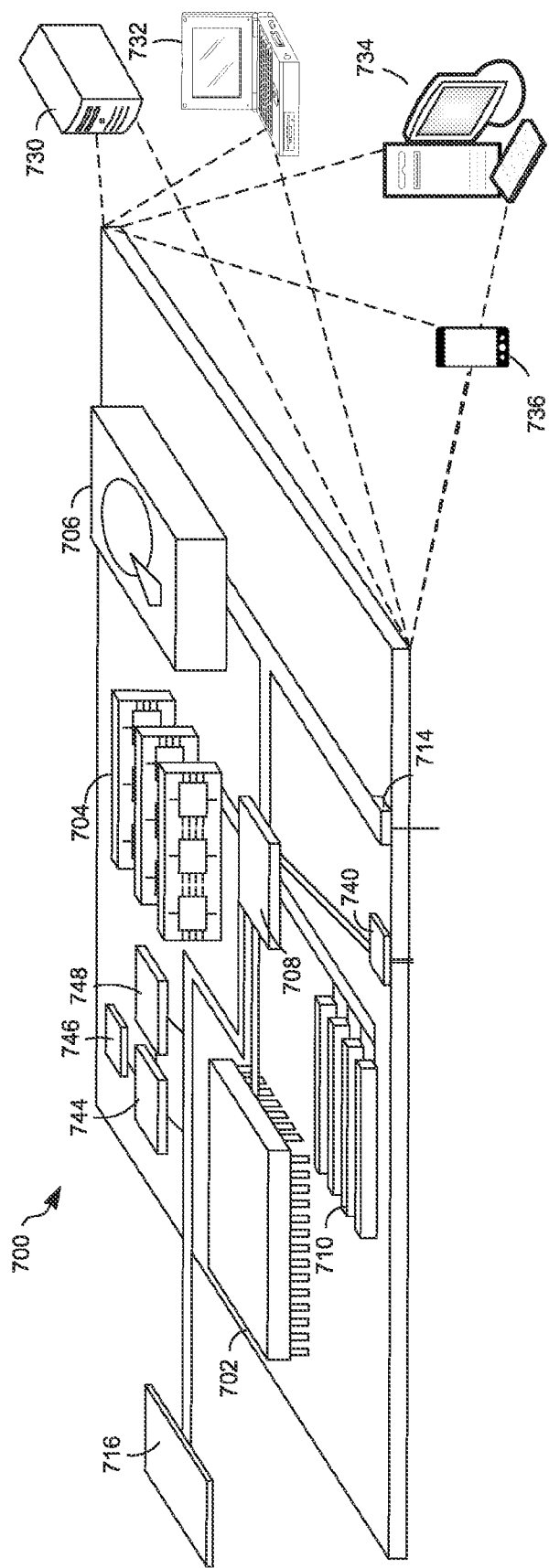
FIG. 7 is a diagram that illustrates an example of a distributed computer device that can be used to implement the described techniques.

FIG. 6 illustrates an example of a generic computer device 600 and a generic mobile computer device 650, which may be used with the techniques described here. Computer device 600 is one example configuration of computer 120 of FIG. 1 and FIG. 2.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low-speed interface 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 500, while the low-speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving image training data representing a plurality of color images and a plurality of near-infrared (NIR) images, each of the plurality of color images being captured with a visible spectrum illumination source, each of the plurality of NIR images being captured with a NIR illumination source; and
generating a prediction engine based on the image training data, the prediction engine being configured to produce an estimated surface normal map of a user and an estimated reflectance map of the user from a color image of the user and a NIR image of the user, the color image of the user and the NIR image of the user being captured within a time period less than a threshold time period from perspectives different by less than a threshold perspective.

2. The method as in claim 1, wherein the plurality of color images and the plurality of NIR images includes, respectively, subsets of the plurality of color images and subsets of the plurality of NIR images, each subset of the plurality of color images and each subset of the plurality of NIR images including an image of a respective subject of a set of subjects in a pose through a plurality of illumination conditions, and wherein the method further comprises:
prior to generating the prediction engine, performing, for each of the set of subjects, a semantic segmentation operation on a color image of a corresponding subset of the plurality of color images to produce a label image for that subject, the label image having a specified number of classes into which each of a plurality of pixels of the color image is categorized, the label image for that subject being included in the image training data.

3. The method as in claim 2, wherein each subset of the plurality of color images and each subset of the plurality of NIR images are captured using an image capture arrangement, the image capture arrangement including, respectively, a plurality of color sources, a plurality of NIR illumination sources, and color and NIR illumination detectors, the plurality of color sources and the plurality of NIR illumination sources being arranged in a geometrical pattern surrounding the color and NIR illumination detectors.

4. The method as in claim 3, wherein the plurality of color sources and the plurality of NIR illumination sources are arranged in corners of a rectangle surrounding the color and NIR illumination detectors.

5. The method as in claim 3, wherein each of the plurality of illumination conditions includes one of the plurality of color illumination sources and one of the plurality of NIR illumination sources producing illumination, and all other of the plurality of color illumination sources and all of the other of the plurality of NIR illumination sources not producing illumination.

6. The method as in claim 3, wherein the color and NIR illumination detectors include a first NIR camera, a second NIR camera, and a color camera, the first NIR camera and the color camera being misaligned by an amount less than a specified misalignment threshold.

7. The method as in claim 3, wherein the image capture arrangement further includes a NIR dot projector configured to project a dot speckle pattern on the subject, the dot speckle pattern being temporally interleaved with illumination emitted by an NIR illumination source of the plurality of NIR illumination sources.

8. The method as in claim 1, wherein the color image of the user and the NIR image of the user are captured essentially simultaneously.

9. The method as in claim 1, wherein the prediction engine includes a first branch and a second branch, the first branch configured to generate surface normal maps, the second branch configured to output predicted reflectance maps.

10. The method as in claim 9, wherein the prediction engine includes a neural network having a unet encoder-decoder architecture with skip level connections, the unet encoder-decoder architecture including an encoder and decoder, the encoder including a set of blocks, each of the set of blocks including a set of convolution layers and a set of ReLU activation layers, the decoder being configured to output surface normal maps in the first branch and predicted reflectance maps in the second branch.

11. The method as in claim 9, wherein generating the prediction engine includes:
supervising a training operation on the prediction engine using a stereo loss and a photometric loss.

12. The method of claim 11, wherein generating the prediction engine further includes:
generating the photometric loss based on a rendering from the estimated surface normal map and the estimated reflectance map under an illumination condition of the plurality of illumination conditions.

13. The method as in claim 12, wherein the estimated reflectance map includes a diffuse component and a specular component, and
wherein generating the photometric loss includes:
using a Lambertian reflectance model to generate a diffuse component of the estimated reflectance map; and
using a Blinn-Phong bidirectional reflectance distribution function (BRDF) to generate a specular component of the estimated reflectance map.

14. The method as in claim 12, wherein generating the photometric loss includes:
generating a binary shadow map based on a stereo depth map and a position of a light source used in generating a color image of the plurality of color images;
generating an observed intensity map based on the estimated reflectance map; and
generating, as the photometric loss, a Hadamard product of the binary shadow map and a difference between the observed intensity map and the color image.

15. The method as in claim 12, further comprising:
acquiring a stereo depth map;
performing a smoothing operation on the stereo depth map to produce a smoothed stereo depth map; and
generating a stereo loss based on the estimated surface normal map and gradients of the smoothed stereo depth map.

16. The method as in claim 15, wherein generating the stereo loss includes:
generating, as an L1 vector loss, an L1 norm of a difference between the estimated surface normal map and the gradients of the smoothed stereo depth map;
generating, as an angular loss, an inner product of the estimated surface normal map and the gradients of the smoothed stereo depth map; and
generating, as the stereo loss, a difference between the L1 vector loss and the angular loss.

17. The method as in claim 1, further comprising:
using the prediction engine to produce the estimated surface normal map of the user and the estimated reflectance map of the user from the color image of the user and the NIR image of the user.

18. The method as in claim 1, wherein the color image of the user is a single color image, and the NIR image of the user is a single NIR image.

19. A computer program product comprising a non-transitory storage medium, the computer program product including code that, when executed by processing circuitry, causes the processing circuitry to perform a method, the method comprising:
receiving image training data representing a plurality of color images and a plurality of near-infrared (NIR) images, each of the plurality of color images being captured with a visible spectrum illumination source, each of the plurality of NIR images being captured with a NIR illumination source; and
generating a prediction engine based on the image training data, the prediction engine being configured to produce an estimated surface normal map of a user and an estimated reflectance map of the user from a single color image of the user and a single NIR image of the user, the single color image of the user and the single NIR image of the user being captured within a time period less than a threshold time period from perspectives different by less than a threshold perspective.

20. An apparatus, the apparatus comprising:
memory; and
controlling circuitry coupled to the memory, the controlling circuitry being configured to:
receive image training data representing a plurality of color images and a plurality of near-infrared (NIR) images, each of the plurality of color images being captured with a visible spectrum illumination source, each of the plurality of NIR images being captured with a NIR illumination source; and
generate a prediction engine based on the image training data, the prediction engine being configured to produce an estimated surface normal map of a user and an estimated reflectance map of the user from a color image of the user and a NIR image of the user, the color RGB image of the user and the NIR image of the user being captured within a time period less than a threshold time period from perspectives different by less than a threshold perspective.

* * * * *